US012564947B2

(12) United States Patent
Yang et al.

(10) Patent No.: US 12,564,947 B2
(45) Date of Patent: Mar. 3, 2026

(54) TEACHING A ROBOT SYSTEM USING HAND GESTURE CONTROL AND VISUAL-INERTIAL-ODOMETRY

(71) Applicant: Schaeffler Technologies AG & Co. KG, Herzogenaurach (DE)

(72) Inventors: Geng Yang, Singapore (SG); Wai Yang Chan, Singapore (SG); Boon Siew Han, Singapore (SG)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 101 days.

(21) Appl. No.: 18/579,473

(22) PCT Filed: Jul. 15, 2021

(86) PCT No.: PCT/EP2021/069703
§ 371 (c)(1),
(2) Date: Jan. 15, 2024

(87) PCT Pub. No.: WO2023/284960
PCT Pub. Date: Jan. 19, 2023

(65) Prior Publication Data
US 2024/0359321 A1       Oct. 31, 2024

(51) Int. Cl.
*B25J 9/16*           (2006.01)
*G05B 19/4155*    (2006.01)

(52) U.S. Cl.
CPC .............. *B25J 9/163* (2013.01); *B25J 9/1666* (2013.01); *B25J 9/1697* (2013.01); *G05B 19/4155* (2013.01); *G05B 2219/50391* (2013.01)

(58) Field of Classification Search
CPC ........ B25J 9/163; B25J 9/1666; B25J 9/1697; B25J 9/1676; G05B 2219/35444;
(Continued)

(56)       References Cited

U.S. PATENT DOCUMENTS 9,327,396 B2      5/2016   Kim
10,835,333 B2    11/2020   Hashimoto et al.
(Continued)

FOREIGN PATENT DOCUMENTS

EP            2699392 B1       10/2015
JP         H09269812 A        10/1997
(Continued)

OTHER PUBLICATIONS

European Patent Office, International Search Report received in International Application No. PCT/EP2021/069703, dated Mar. 22, 2022, 22 pages (including translation).

*Primary Examiner* — Nhi Q Bui
(74) *Attorney, Agent, or Firm* — Suiter Swantz IP

(57)                ABSTRACT
A computer-implemented method of teaching a robot system is provided. The method may comprise detecting, by a first sensor system (102) of the robot system, an operator's hand gesture (103), and moving (S3) a robotic arm (101) of the robot system in accordance with the operator's hand gesture (103). The method may comprise detecting (S31), by a second sensor system (104) of the robot system, an impending collision of the robotic arm (101) with an obstacle (105), and moving the robotic arm (101) along at least a section of a collision-free path (106) around the obstacle (105). By advantageously combining hand gesture control and visual-inertial-odometry, the invention results in an improved teaching of a robotic arm trajectory.

16 Claims, 2 Drawing Sheets

(58) Field of Classification Search
　　CPC ........... G05B 2219/36401; G05B 2219/36412;
　　　　　　　　　G05B 2219/39082; G05B 2219/39088;
　　　　　　　　　G05B 2219/50391; G05B 19/4155; G05B
　　　　　　　　　　　　　　　　　　　　　　　　19/42
　　See application file for complete search history.

(56) References Cited

U.S. PATENT DOCUMENTS

| | | | |
|---|---|---|---|
| 2015/0217450 A1 | 8/2015 | Huang et al. | |
| 2016/0031083 A1* | 2/2016 | Embon | .................. B25J 9/1676 |
| | | | 901/49 |
| 2018/0361594 A1* | 12/2018 | Haddadin | .............. B25J 9/1656 |
| 2019/0105779 A1* | 4/2019 | Einav | ..................... B25J 9/1689 |
| 2019/0291276 A1* | 9/2019 | Asplund | .............. G01B 11/002 |
| 2019/0337152 A1* | 11/2019 | Homberg | ............. G06V 10/147 |

FOREIGN PATENT DOCUMENTS

| | | |
|---|---|---|
| JP | H1165636 A | 3/1999 |
| JP | 2011110620 A | 6/2011 |
| JP | 2013027953 A | 2/2013 |
| TW | I530375 B | 4/2016 |
| WO | 2021016394 A1 | 1/2021 |
| WO | 2021161950 A1 | 8/2021 |

* cited by examiner

TEACHING A ROBOT SYSTEM USING HAND GESTURE CONTROL AND VISUAL-INERTIAL-ODOMETRY

CROSS-REFERENCE TO RELATED APPLICATION

The present application is the U.S. National Phase of PCT Patent Application Number PCT/EP2021/069703, filed on Jul. 15, 2021, the entire disclosure of which is incorporated by reference herein.

TECHNICAL FIELD

The present application relates generally to the field of robot control, and more particularly to improved techniques for teaching robot systems using hand gesture control and visual-inertial-odometry.

BACKGROUND

Robots have become an indispensable tool of modern industrial automation. A robot system may comprise one or more robotic arms, typically in the form of mechanical arms that can perform physical tasks, using human supervision and control. However, teaching a robotic arm to perform a task is challenging and robotic specialists usually have to explicitly program the robotic arm for each task. To make the teaching of a robotic arm easier, approaches such as hand gesture control have been developed which enable an operator to teach the robotic arm in a more intuitive and user-friendly manner.

In the field of computer vision, techniques have been developed for interpreting hand gestures by a computer as a basis for various aspects of human-machine interaction. One purpose of hand gesture recognition is to identify a particular hand gesture and convey the information to the robotic arm pertaining to the individual gesture. On this basis, a specific command for execution of an action can be given to the robotic arm, building an effective communication channel between the operator and the robotic arm, which does not depend on traditional input devices, such as keyboard and mouse.

For example, U.S. Pat. No. 10,835,333 B2 titled "Remote control robot system" discloses a system which allows an operator to control a robotic arm of a robot system using body gestures, hand gestures or vocalizations. In addition to the gesture control system, the robot system may be equipped with a camera attached to an end effector of the robotic arm. The motivation behind this additional camera is that the captured images can be output on a monitor, allowing the operator to check the work situation on the monitor while remotely controlling the robot arm.

A similar technique is proposed in U.S. Pat. No. 9,327, 396 B2 titled "Tele-operation system and control method thereof", which discloses a tele-operation system enabling a robot arm to move by following a hand motion of a user. Also in this system, the robot may include an additional sensor to detect a work environment and to display information related to the surroundings of the robot on a display.

As mentioned, hand gesture control cannot only be used for directly controlling a robotic arm, but also to teach the robot, i.e., the operator can perform a desired movement or work task and the robotic arm can learn the move trajectory and task execution naturally and intuitively from the operator. The robot is then able to repeat the learned task autonomously.

For example, TW I530375 B and its family member US 2015/217450 A1 titled "Teaching device and method for robotic arm" disclose a teaching device and method for a robotic arm. The teaching device comprises a robotic arm, a control device, and a gesture recognition module. The gesture recognition module detects a control gesture signal and transmits the detected control gesture signal to the control device. The control device in turn teaches the robotic arm to move.

However, the inventors of the present application have found that using hand gesture control to teach a robot has its limits. One reason is that the operator's perception is sometimes limited during the teaching process so that the operator may not teach the most reliable and efficient trajectory to the robotic arm. The above-discussed systems, which display information about the robot's surroundings on a monitor for the operator to observe, may improve this situation to some degree. However, they still require the operator to constantly switch back and forth between concentrating on the robot arm and its control by way of hand gestures and observing the monitor to check the robot's surroundings.

Moreover, although the operators typically possess a sufficient degree of domain knowledge for the task execution, they may still not teach the robotic arm trajectory properly. For example, due to the limitation of perception or other reasons, the trajectory taught by the operator may not be the most efficient moving path for the task at hand.

It is therefore one problem underlying the present disclosure to provide methods and systems for teaching a robot system using hand gesture control which results in a particularly safe and efficient operation of the robot system, thereby at least partly overcoming the drawbacks of the prior art.

SUMMARY

This problem is in one aspect solved by a computer-implemented method of teaching a robot system. The method may comprise detecting, by a first sensor system of the robot system, an operator's hand gesture, and moving a robotic arm of the robot system in accordance with the operator's hand gesture.

Accordingly, this aspect of the disclosure provides a remote-controlled teaching technique for a robotic arm by hand gestures, which is particularly useful e.g., when there is a safety concern. This allows the operator to teach the robotic arm in a contactless and very natural manner. For example, by using different hand gestures, the operator may define the robotic arm start position, moving trajectory, end position and/or various kinds of executions for a specific task cycle.

However, due to the above-discussed limitation of perception typically involved when teaching a robot from a distance using hand gestures, the operator may not be fully aware of certain obstacles and the robotic arm may hit these obstacles if it followed the hand gesture movement. In the prior art techniques, the burden of defining a collision-free path is left completely to the operator, and the approach generally followed in the prior art is to try to help the operator achieve this by displaying information about the robot's surrounding on a monitor for the operator to investigate during the controlling of the robot. This is in line with the current trend in the industrial robot industry to enhance the human operator's competence by way of more information e.g., with the help of augmented reality. The rationale behind this approach is that in the prior art it is a well-accepted principle that the human operator should always be the final control instance.

The present disclosure departs from this known thought pattern in that, preferably during the teaching process, the method may comprise detecting, by a second sensor system of the robot system, an impending collision of the robotic arm with an obstacle, and the method may further comprise moving the robotic arm along at least a section of a collision-free path around the obstacle.

Unlike in the prior art, the above-mentioned aspect of the present disclosure method not only displays information pertaining to the robot surroundings passively on a monitor for the operator to double-check, but advantageously combines hand gesture control and visual-inertial-odometry (VIO) to teach an improved robotic arm trajectory. VIO refers to the localization of an object in an unknown environment, typically by using an inertial measurement unit (IMU) and/or a monocular camera. Using VIO, information about the robotic arm's surrounding environment can be collected in real-time, so that the trajectory can be optimized autonomously by the robotic system.

In particular, using VIO, the robotic arm is enabled to automatically and/or autonomously deviate from the path prescribed by the operator, and to instead follow a collision-free path despite the operator's control. In the hand gesture control techniques known in the prior art, which are based on the fundamental principle that the human operator has full control at every point in time, such a "disobedience" with respect to the operator's control may appear very uncommon and counter intuitive. However, the inventors have realized that doing so advantageously solves the above-mentioned problem and enables the robot system to learn an optimized and safe path while the operators' acceptance is still high once they realize the benefits, namely that a collision-free path is eventually obtained despite the operator's sub-optimal teaching.

In one aspect of the disclosure, moving the robotic arm along at least a section of the collision-free path around the obstacle may comprise halting the robotic arm at a predetermined safety distance before colliding with the obstacle. If the robotic arm has moved essentially in a vertical direction in accordance with the operator's hand gesture, the method may comprise moving the robotic arm essentially in a horizontal direction until the path in accordance with the operator's hand gesture does no longer include an impending collision. If the robotic arm has moved essentially in a horizontal direction in accordance with the operator's hand gesture, the method may comprise moving the robotic arm essentially in a vertical direction until the path in accordance with the operator's hand gesture does no longer include an impending collision. In any case, the method may further comprise continuing moving the robotic arm in accordance with the operator's hand gesture. Accordingly, the obstacle in the path intended by the operator can be circumvented comparatively easily but effectively.

In another aspect of the disclosure, the method may comprise determining an optimized path for the robotic arm based on the collision-free path and/or information relating to the robot system's environment detected by the second sensor system. The optimized path may be optimized to minimize a cycle time while being collision-free. The step of determining the optimized path may be performed after the training of the robotic arm is finished. This aspect is particularly advantageous because even when the teach trajectory is collision-free due to the robot system's above-described self-correction, the trajectory may still not be the shortest moving path for the task at hand. Therefore, the optimized path may eventually lead to a more resource-efficient operation of the robotic system.

The first sensor system may comprise a first camera. The first sensor system may be arranged at a fixed location of the robot system. Accordingly, the first sensor system may provide a means for capturing hand gestures performed by an operator in the vicinity of the robot system.

The second sensor system may comprise a second camera. For example, the camera may be a tracking camera, such as the Intel® RealSense™ Tracking Camera T265. The second camera may comprise two lens sensors. The second sensor system may comprise an inertial measurement unit. The second sensor system may be arranged on the robotic arm. Accordingly, the second sensor system may provide VIO functionality configured to localize objects in the vicinity of the robotic arm.

In yet another aspect of the disclosure, the method may comprise storing one or more control instructions which, upon execution, cause the robotic arm to move along the collision-free path or the optimized path. In addition, the method may comprise sending the one or more control instructions to the robot system and/or executing the one or more control instructions by the robot system. Accordingly, the collision-free and possibly further optimized trajectory may be used to directly control the robotic system during operation.

The present disclosure also provides an apparatus comprising means for carrying out any of the methods disclosed herein.

Furthermore, an apparatus is provided, the apparatus comprising: a processor; and a memory coupled to the processor, the memory storing executable instructions that, when executed by the processor, cause the apparatus to: detect, by a first sensor system of a robot system, an operator's hand gesture; move a robotic arm of the robot system in accordance with the operator's hand gesture; detect, by a second sensor system of the robot system, an impending collision of the robotic arm with an obstacle; and move the robotic arm along at least a section of a collision-free path around the obstacle.

The memory may further store executable instructions that, when executed by the processor, cause the apparatus to perform any of the methods disclosed herein.

In any of the apparatuses disclosed herein, the apparatus may be the robot system, or an apparatus separate from the robot system.

A computer program is also provided, comprising instructions which, when the program is executed by a computer, cause the computer to carry out any of the methods disclosed herein.

Lastly, a computer-readable medium is also provided comprising instructions which, when executed by a computer, cause the computer to carry out any of the methods disclosed herein.

BRIEF DESCRIPTION OF THE DRAWINGS

The disclosure may be better understood by reference to the following drawings.

DESCRIPTION OF EMBODIMENTS

Embodiments of the present disclosure provide an improved teaching process for robot systems. In one embodiment, a first camera fixed at a station is used to detect hand gestures of an operator. A hand gesture recognition model may be used to translate the detected hand gesture signal(s) into control command(s) for the robotic arm, thereby teaching the robotic arm to move and execute the desired action. A second camera, in particular a tracking camera, includes in one embodiment two lens sensors and an inertial measurement unit (IMU), and is mounted on the robotic arm to provide visual-inertial-odometry (VIO) functionality. When the operator teaches the robotic arm movement with one or more hand gestures, the surrounding environment of the robotic arm through such movement can be detected by the tracking camera, so that the teaching trajectory can be corrected automatically if a collision risk is detected. After the teaching process, with the initial trajectory and/or the surrounding environment information recorded, the robotic arm trajectory to be used for the actual operation of the robot system can be further optimized to reduce cycle time.

Figure 1:
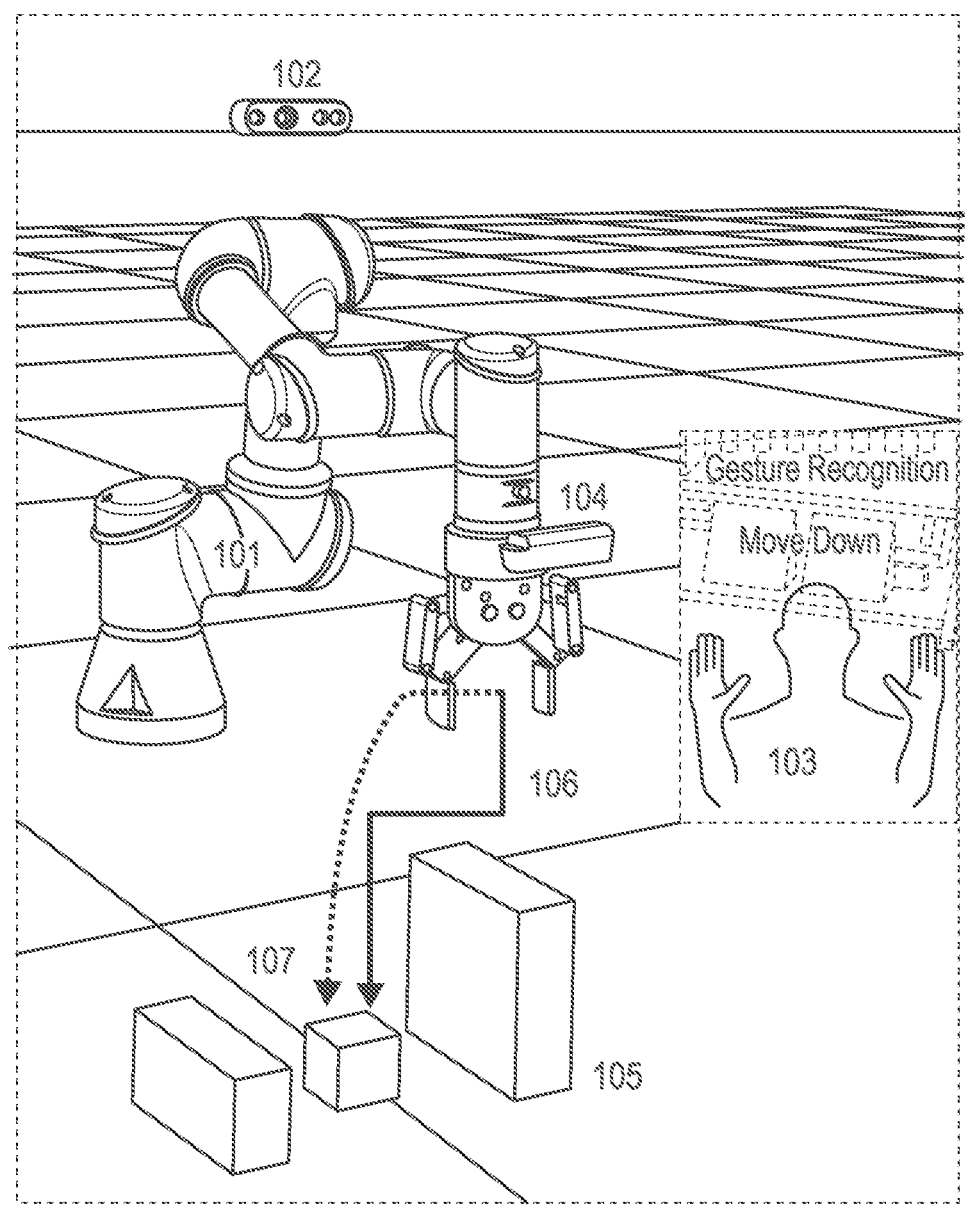
FIG. 1: A robot system in accordance with embodiments of the disclosure.

FIG. 1 illustrates an exemplary robot system in accordance with an embodiment of the disclosure. As can be seen, the robot system comprises a robotic arm 101, which is the teaching object.

A detection camera 102 is fixed at a station, e.g., above the robotic arm and faces to the front, to detect the hand gestures 103 of an operator. This allows the operator to move the robotic arm 101 and execute the desired action(s).

Another tracking camera 104 equipped with dual lenses and an IMU is mounted on the robotic arm 101, preferably near the end effector, and faces down in the example of FIG. 1. Therefore, when the operator moves the robotic arm trajectory, the tracking camera 104 can check the surrounding environment.

If obstacles 105 are detected on the moving path and there is a risk of collision, the robotic arm 101 will actively self-correct the moving path even before operator's instruction, which leads to a collision-free path 106, as illustrated in FIG. 1.

After the teaching process is finished, the initial trajectory 106 learned from the operator and the obstacle information can be sent to an optional optimization engine, so that an optimized trajectory (e.g., with reduced cycle time) can be calculated to form the final robotic arm trajectory 107 for the task. The person skilled in the art will appreciate that there are various trajectory planning techniques that can be used in embodiments of the disclosure. For example, the optimization engine may be implemented based on the Open Motion Planning Library (OMPL), an Open Source library provided by Kavraki Lab, Department of Computer Science at Rice University. Other suitable techniques include without limitation Pilz Industrial Motion Planner, Stochastic Trajectory Optimization for Motion Planning (STOMP), Search-Based Planning Library (SBPL), and Covariant Hamiltonian Optimization for Motion Planning (CHOMP).

Figure 2:
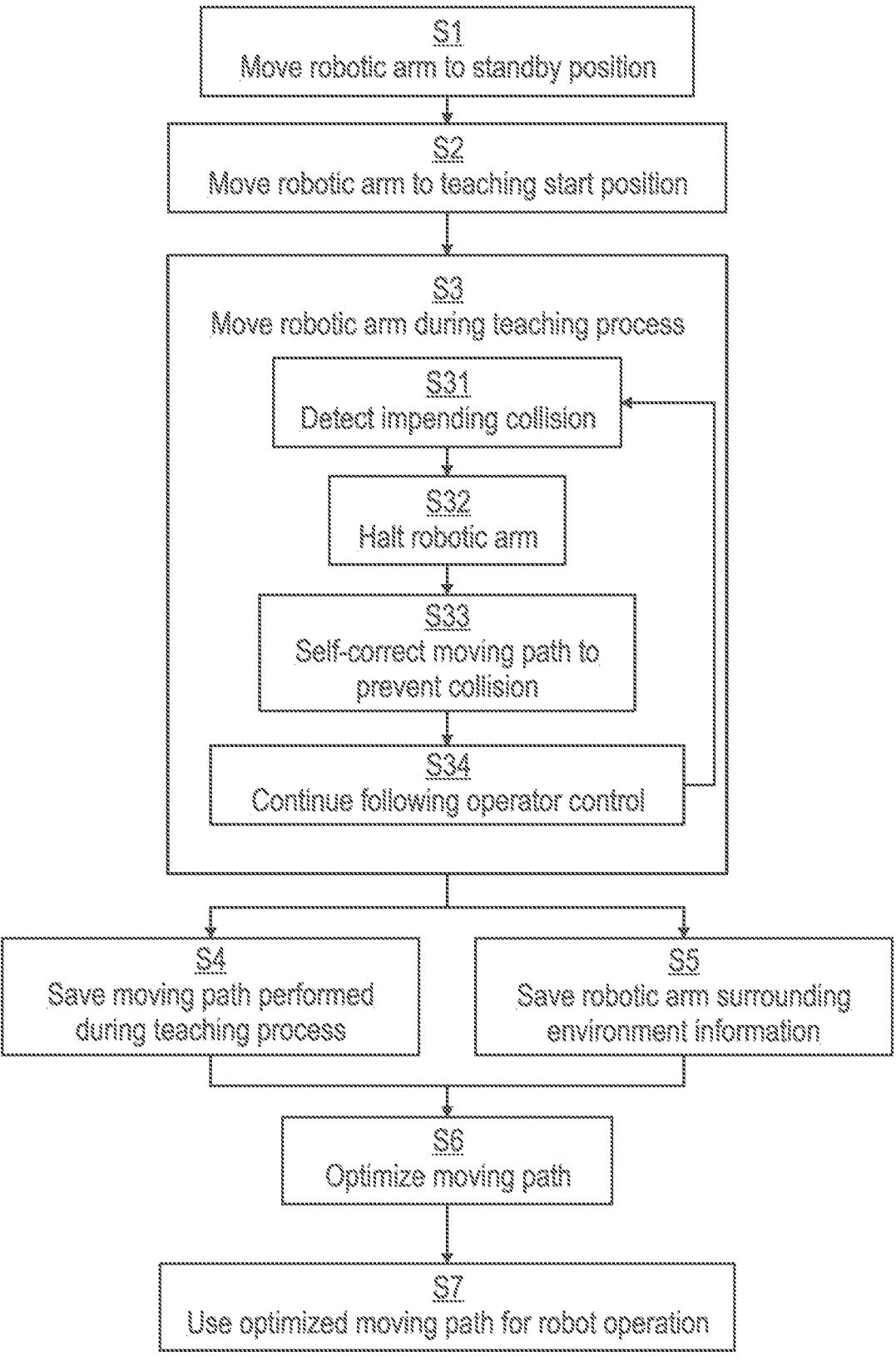
FIG. 2: A flowchart illustrating a teaching process in accordance with embodiments of the disclosure.

FIG. 2 illustrates a teaching process in accordance with one exemplary embodiment of the disclosure. It shall be understood that the order of the steps is exemplary. Other embodiments might include only a subset of the illustrated steps.

In step S1, the operator may use a hand gesture to trigger the teaching mode of the robotic arm 101. In response the robotic arm 101 may move to a standby position. Alternatively, the standby mode may be triggered by input commands different from a hand gesture, such as a voice command or input via a user interface element on a graphical user interface.

In step S2, the operator may use a hand gesture to move the robotic arm 101 until the robotic arm 101 has reached the intended start position for the task to be taught. The operator may indicate that the start position has been reached by way of a hand gesture or other suitable command.

After these preparatory steps, step S3 includes the actual teaching process, in which the operator may continue using one or more hand gestures to move the robotic arm 101, thereby defining a path to be performed by the robotic arm 101 until an intended end position for the task to be taught is reached.

During the movement, if the tracking camera 104 senses an obstacle 105 in the moving path, the robotic arm 101 will self-correct the moving path to prevent the impending collision.

In one embodiment, the self-correction method may be implemented to obtain the shortest moving path which is still collision-free. For example, the self-correction method may include the following: If the tracking camera 104 senses the obstacle 105 (see step S31) when the robotic arm 101 follows operator's hand gesture and moves vertically, the robotic arm 101 will halt at a safety distance (see step S32) before hitting the obstacle 105 and move horizontally along the shortest path to have enough space to circumvent the obstacle 105 (see step S33). Thereafter, the robotic arm 101 will continue to follow the hand gesture and move vertically (see step S34), which results in the self-corrected trajectory 106 shown in FIG. 2. Similarly, if the tracking camera 104 senses an obstacle 105 (see step S31) when the robotic arm 101 follows operator's hand gesture and moves horizontally, the robotic arm 101 will halt at a safety distance (see step S32) before hitting the obstacle 105 and move vertically along the shortest path to have enough space to circumvent the obstacle 105 (see step S33). Thereafter, the robotic arm 101 will continue to follow the hand gesture and move horizontally (see step S34).

Optionally, the self-correction method may be preceded by a pre-processing step, which may comprise obtaining a discretized representation of the obstacle 105, for example in the form of a set of voxels in 3D space. Using the discretized representation of the obstacle 105, the actual shape of the obstacle 105 does not affect the above-described self-correction method.

In both cases, the required safety distance may be a predetermined distance, which may be configured as needed. The safety distance typically depends on factors such as the dimension/size of the robotic arm 101, the obstacle size, part dimension and/or usage scenario. Typically, the safety distance is set by the operator after an assessment of all factors or at least those relevant for the use case at hand.

After the teaching process shown in step S3, the method may move on to steps S4 and/or S5, which might be performed in parallel or sequentially. The moving path 106 of the robotic arm 101 may be saved in step S4 so that it can be used as a reference trajectory. In step S5, the tracking camera 104 mounted on the robotic arm 101 may also record the robotic arm surrounding environment information captured during the teaching process.

With the initial reference trajectory 106 and/or the robotic arm surrounding environment information as input, an optimization engine may be used in step S6 to further optimize the trajectory 106 for the robotic arm's actual operation. Different from the self-correction in step S3, which focuses on collision prevention only, the optimization in step S6 may serve to identify an optimal robotic arm moving trajectory 107 with shortest cycle time which is still collision-free based on the reference trajectory 106 as well as the robotic arm surrounding environment information. A number of suitable algorithms for path optimization have already been explained above. One particular embodiment of the disclosure uses CHOMP, which is a gradient-based trajectory optimization procedure that makes the motion planning aspect of the embodiment both simple and trainable.

Finally, i.e., either after the recording of the self-corrected path 106 or after its optimization to obtain an optimized path 107, the robotic arm 101 may resume normal operation with the (optimized) trajectory for the task at hand. To this end, the self-corrected path 106 or the optimized path 107 may serve as input for the generation of suitable control signals for controlling the robotic arm 101 during operation (see step S7).

The invention claimed is:

1. A computer-implemented method of teaching a robot system, the method comprising:
    detecting, by a first sensor system of the robot system, a hand gesture of an operator;
    moving a robotic arm of the robot system along a path in accordance with the hand gesture of the operator;
    detecting, by a second sensor system of the robot system, an impending collision of the robotic arm with an obstacle; and
    moving the robotic arm along at least a section of a collision-free path around the obstacle, wherein moving the robotic arm along at least the section of the collision-free path around the obstacle comprises:
        moving the robotic arm in a vertical direction in accordance with the hand gesture of the operator;
        halting the robotic arm at a predetermined safety distance before colliding with the obstacle;
        moving the robotic arm in a horizontal direction until the path in accordance with the hand gesture of the operator no longer includes the impending collision;
        continuing moving the robotic arm in accordance with the hand gesture of the operator.

2. The method of claim 1, further comprising: determining an optimized path for the robotic arm based on the collision-free path and/or information relating to an environment of the robot system detected by the second sensor system.

3. The method of claim 2, wherein the optimized path is optimized to minimize a cycle time while being collision-free.

4. The method of claim 1, wherein the first sensor system comprises a first camera; and/or wherein the first sensor system is arranged at a fixed location of the robot system.

5. The method of claim 1, wherein the second sensor system comprises a second camera, wherein the second camera preferably comprises two lens sensors; and/or wherein the second sensor system comprises an inertial measurement unit; and/or wherein the second sensor system is arranged on the robotic arm.

6. The method of claim 1, further comprising:
    storing one or more control instructions which, upon execution, cause the robotic arm to move along the collision-free path.

7. The method of claim 6, further comprising:
    sending the one or more control instructions to the robot system and/or executing the one or more control instructions by the robot system.

8. An apparatus comprising:
    a processor; and a memory coupled to the processor, wherein the memory is configured to store executable instructions that, when executed by the processor, cause the processor to perform the steps of:
    detecting, by a first sensor system of a robot system, a hand gesture of an operator;
    moving a robotic arm of the robot system along a path in accordance with the hand gesture of the operator;
    detecting, by a second sensor system of the robot system, an impending collision of the robotic arm with an obstacle; and
    moving the robotic arm along at least a section of a collision-free path around the obstacle, wherein moving the robotic arm along at least the section of the collision-free path around the obstacle comprises:
        halting the robotic arm at a predetermined safety distance before colliding with the obstacle;
        when the robotic arm has moved in a vertical direction in accordance with the hand gesture of the operator, moving the robotic arm in a horizontal direction until the path in accordance with the hand gesture of the operator no longer includes the impending collision;
        when the robotic arm has moved in the horizontal direction in accordance with the hand gesture of the operator, moving the robotic arm in the vertical direction until the path in accordance with the hand gesture of the operator no longer includes the impending collision; and
        continuing moving the robotic arm in accordance with the hand gesture of the operator.

9. The apparatus of claim 8, further comprising: determining an optimized path for the robotic arm based on the collision-free path and/or information relating to an environment of the robot system detected by the second sensor system.

10. The apparatus of claim 8, wherein the first sensor system comprises a first camera.

11. The apparatus of claim 8, wherein the second sensor system comprises a second camera.

12. The apparatus of claim 11, wherein the second camera comprises two lens sensors.

13. The apparatus of claim 8, wherein the second sensor system comprises an inertial measurement unit.

14. The apparatus of claim 8, further comprising:
    sending one or more control instructions to the robot system and executing the one or more control instructions by the robot system.

15. A robot system comprising:
    a first sensor system;
    a second sensor system;
    a robotic arm;
    a processor; and
    a memory coupled to the processor, wherein the memory is configured to store executable instructions that, when executed by the processor, cause the processor to:
        detect, by the first sensor system, a hand gesture of an operator;
        move the robotic arm along a path in accordance with the hand gesture of the operator;
        detect, by the second sensor system, an impending collision of the robotic arm with an obstacle; and
        move the robotic arm along at least a section of a collision-free path around the obstacle, wherein moving the robotic arm along at least the section of the collision-free path around the obstacle comprises:

halting the robotic arm at a predetermined safety distance before colliding with the obstacle;

when the robotic arm has moved in a vertical direction in accordance with the hand gesture of the operator, moving the robotic arm in a horizontal direction until the path in accordance with the hand gesture of the operator no longer includes the impending collision;

when the robotic arm has moved in a horizontal direction in accordance with the hand gesture of the operator, moving the robotic arm in a vertical direction until the path in accordance with the hand gesture of the operator no longer includes the impending collision; and continuing moving the robotic arm in accordance with the hand gesture of the operator.

16. The system of claim 15, wherein the first sensor system comprises a first camera and the second sensor system comprises a second camera.

* * * * *